Sept. 8, 1942. C. C. CLYMER 2,295,336
CONTROL SYSTEM FOR INDUCTION MOTORS
Filed June 30, 1939
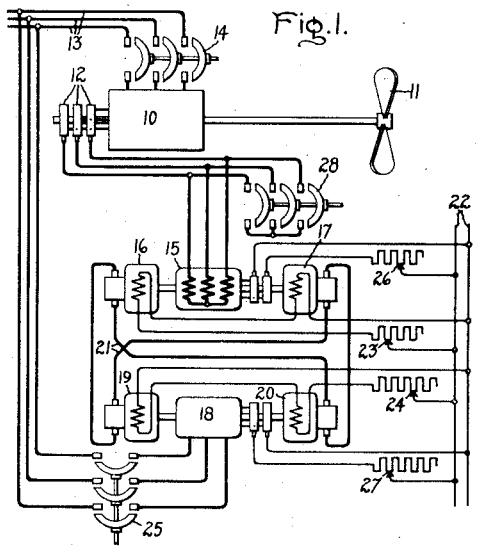
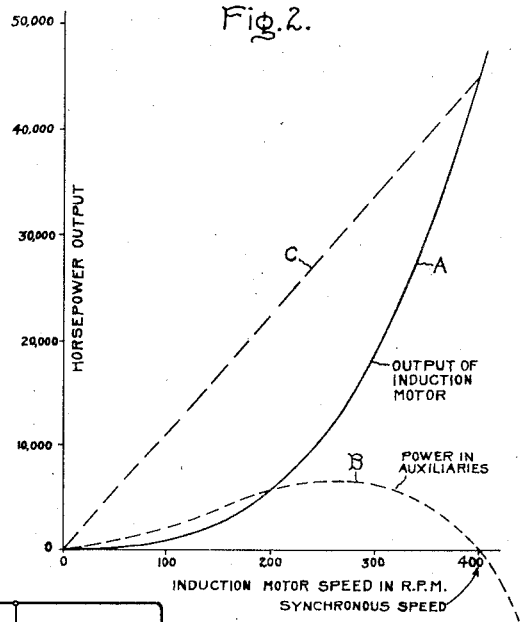
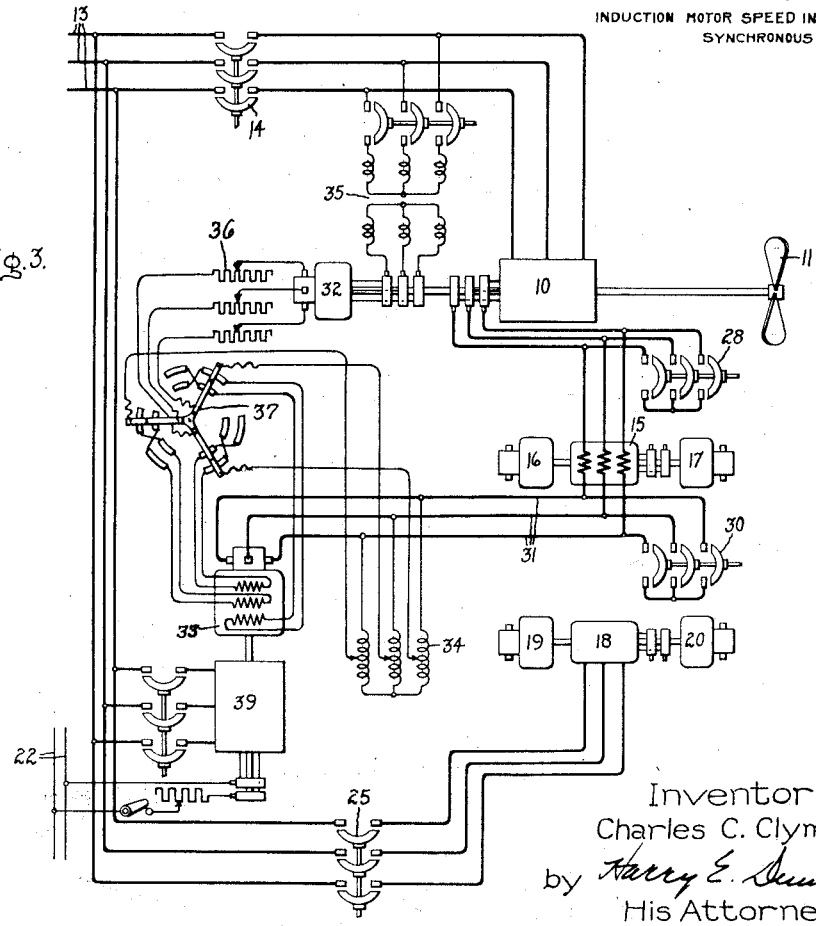
Inventor:
Charles C. Clymer,
by Harry E. Dunham
His Attorney.

Patented Sept. 8, 1942

2,295,336

UNITED STATES PATENT OFFICE 2,295,336

CONTROL SYSTEM FOR INDUCTION MOTORS

Charles C. Clymer, Schenectady, N. Y., assignor to General Electric Company, a corporation of New York Application June 30, 1939, Serial No. 282,238

2 Claims. (Cl. 172—274)

My invention relates to a system of control for induction motors of the type which have a wound secondary. One object of my invention is to provide for a wide range of speed, using auxiliary control machines of relatively small capacity and of high efficiency, and having the flexibility of the Ward Leonard system. Another object is to provide such a system in which peak load demands, such as are oftentimes encountered in starting a large induction motor, are avoided. Another object of the invention is to provide a system of control having the above features which use power taken from an alternating current system at a high and adjustable power factor. The system is particularly adapted for the driving of large fans such as those used in large wind tunnels for the testing of aeroplane propellers where the fan driving motor must be kept at a minimum diameter in order not to choke the tunnel or require an enlarged motor pocket therein. The invention is however not limited in its use to this particular type of load.

The features of my invention which are believed to be novel and patentable will be pointed out in the claims append hereto. For a better understanding of my invention reference is made in the following description to the accompanying drawing in which Fig. 1 represents the different machines of my system and their connections for operation up to synchronous speed; Fig. 2 represents curves showing the power handled by the auxiliary control machines for various power outputs of the main motor of Fig. 1 when driving a fan load, and Fig. 3 represents the apparatus when arranged for supersynchronous operation.

In Fig. 1, 10 represents a large induction motor connected to drive a fan load represented at 11. For purposes of illustration only, let it be assumed that the motor is a 45,000 horsepower, 6600 volt motor having 18 poles and therefore having a synchronous speed of 400 R. P. M. Let it further be assumed that it is desired to drive the fan at any and all speeds from zero speed up to 400 R. P. M., and be able to adjust the speed to and from any value between these limits and to run indefinitely at any speed. Let it further be required that this speed control must be accomplished without appreciable loss of power in the secondary circuit of the motor, such as would be the case if the speed control was obtained by adjusting resistances in the secondary circuit of the motor. Let it further be required that the power factor of the alternating current load taken from the available power supply be kept at or near unity, and that starting and speed changes be accomplished without subjecting the supply lines to heavy current surges.

Let it further be required that the amount of power which is necessarily supplied from the secondary of the induction motor for speed control purposes be kept at a comparatively small value, for example, not greater than 15 per cent of the maximum power input of 45,000 horsepower in order that the auxiliary control machines or apparatus may be of correspondingly small capacity and cost.

The apparatus now to be described meets all of these requirements and embodies other features which are desirable from the standpoint of simplicity, reliability, and economy, as will be pointed out as the description proceeds.

The motor 10 has a wound secondary winding with slip ring terminals at 12. The primary of the motor is supplied from the alternating current system represented at 13 through a circuit breaker at 14. It will be noted that no starting compensator or its equivalent is provided in the alternating current supply lines to the motor, since none is required. The secondary winding of the induction motor is connected to the alternating current primary winding of a synchronous motor 15 which is directly connected to drive direct current generating apparatus preferably comprising two D.-C. generators 16 and 17. 18 represents a synchronous generator which is driven by direct current motor apparatus, preferably comprising two similar direct current motors 19 and 20. The direct current motors 19 and 20 are supplied from the direct current generators 16 and 17 through a connection 21 which connects all of the direct current machines in series. It will be noted that in this series connection the direct current machines are connected in series in the following order: generator 16, motor 20, generator 17, and motor 19. That is, the generators alternate with the motors and hence the voltages employed in the D.-C. series system do not exceed in value that of a single generator.

The field windings of direct current generators 16 and 17 are connected in series and supplied from a direct current supply 22 through an adjusting rheostat 23. Also, the field windings of direct current motors 19 and 20 are connected in series and supplied from the direct current bus 22 through an adjusting resistance 24. By this arrangement it is apparent that each direct current machine must take its proper share of any load which is being transferred between one of the regulating sets to the other. The connecting arrangement of the pairs of direct current machines per se is not my invention. However, I have arranged my auxiliary control apparatus to take full advantage of such connecting arrangement.

The primary winding of the synchronous generator 18 is connected to feed the power used for regulating purposes back to the supply line 13 through a circuit breaker 25. The direct current field windings of the synchronous machines 15 and 18 are supplied through rheostats 26 and 27 respectively from the direct current bus 22.

In starting up the apparatus the auxiliary apparatus is started first in any convenient manner. For example, machine 18 may be started as a motor from power supply 13 and then its D.-C. field applied. As will be pointed out later, the auxiliary machines are of small capacity as compared to the induction motor 10 and since the set thus started by motor 18 is unloaded, the starting current drawn thereby is well below the normal full load current of motor 10. The set consisting of machines 15, 16 and 17 may be started next, using machines 16 and 17 as motors supplied by machines 19 and 20 used as generators. It is noted that such starting requires no change in connections of the auxiliary apparatus and when the auxiliary sets have been started in this manner, they are also connected for normal operation. The field of synchronous machine 15 is applied and the voltage and speed of machine 18 are adjusted until its voltage and frequency, when transformed through the stationary windings of motor 10, are equal to the voltage and frequency of line 13. Switch 14 may now be closed when the alternating current voltages across it are in the correct phase relation without drawing any current from line 13. Now the apparatus is completely connected and is adjusted for zero speed of the induction motor.

To start the motor 10 and raise its speed, field rheostat 24 is adjusted to gradually cut out resistance, causing machines 19 and 20 to act as motors. Energy is now taken from the secondary of motor 10 and drives machine 15 as a synchronous motor. This energy, less the small losses in the auxiliary machines, is returned to line 13 by machine 18 acting as a synchronous generator. At low speeds of motor 10 the fan load is low, hence the motor starts easily and the requirement that the apparatus be started without drawing heavy starting current from the A.-C. supply is met.

The speed control of motor 10 has all of the flexibility and stability of the Ward Leonard system of control and the speed may be raised or lowered as gradually or as fast as desired by adjustment of the direct current field windings. Ordinarily sufficient adjustment can be had by field rheostat 24, but I have shown a rheostat for adjusting the field current of D.-C. machines 16 and 17, should that be desirable, either for reasons of efficient operation or speed control. The set comprising machines 18, 19 and 20 operates at constant speed, since machine 18 is synchronized with line 13. The set comprising machines 15, 16 and 17 operates at a variable speed because its synchronous motor 15 is synchronized with the variable frequency supplied from the secondary of the induction motor 10, which frequency varies from line frequency at standstill to zero frequency at synchronous speed. At synchronous speed of motor 10 the set driven by motor 15 is at standstill and the secondary of the induction motor will be practically short circuited through the primary winding of machine 15 which now generates no voltage. The A.-C. winding of this machine will be designed for the maximum current and voltage of the secondary of the induction motor. However, it will be evident that these maximums do not occur at the same time. Where the motor 10 is to be run any length of time at full speed, a short circuiting circuit breaker represented at 28 may be closed and the auxiliary equipment deenergized entirely until again needed. It will be evident that motor 10 may be shut down when operating at any speed by simply opening circuit breaker 14. The field rheostat 26 of synchronous machine 15 will need little if any adjustment, since for a given setting the voltage of machine 15 increases with speed and frequency and the voltage of the secondary of the induction motor likewise increases with frequency. Speed control of the induction motor is thus obtained primarily by field rheostat 24 and the flexibility, wide range, and ease of control requirements are thus fulfilled.

All of the power taken from the secondary of the induction motor for speed control purposes, less that used up in the operation of the auxiliary control machines, is returned to line 13 by synchronous generator 18 and hence the efficiency requirement is met.

High power factor, or even leading power factor operation of the equipment, is obtained by reason of the fact that we have synchronous auxiliary machines connected to both the primary and the secondary of the induction motor, and the direct current field windings of these machines may be excited to the extent necessary for any desirable power factor operation. Hence the unity power factor requirement is met. In this connection it may be stated that power factor correction from synchronous machine 15 is not available to any appreciable extent when its speed is low. However, at this time the induction motor is operating at high speed where its power factor is reasonably good and sufficient power factor correction can then be had with synchronous machine 18 alone, which always operates at full rated speed. The power factor of the induction motor is lowest at low speeds. However, at this time synchronous machine 15 is operating at a fairly high speed and is thus available for the additional power factor correction needed. Hence the arrangement works out very nicely for taking care of power factor correction more or less automatically under all conditions with complications and with a minimum amount of adjustment for that purpose.

The curves of Fig. 2 show calculated values of shaft power output of motor 10 and electrical power output from its secondary at different speeds, using a 6600 volt, 45,000 horsepower, 18 pole induction motor as an example. Both curves use the speed of the induction motor 10 as the abscissa, i. e. the speed of the induction motor varies from zero to 400 R. P. M. for the equipment of Fig. 1. Curve A is the curve of horsepower output of the induction motor when driving a fan load. This curve goes up approximately as the cube of the speed and is typical of fan loads. Curve B represents the energy at different speeds supplied from the secondary of the induction motor to the auxiliary equipment, but plotted in terms of horsepower instead of in kilowatts in order that it may be readily compared to horsepower curve A. It is seen that at low speeds of the induction motor, the amount of power supplied to the auxiliary equipment from the secondary of the induction motor exceeds the horsepower output of the motor and only becomes less at above half speed. However, at low speeds the horsepower output of the induction motor is low and while the auxiliary power curve B represents a high percentage of the horsepower output at such speeds, it is lower in actual value than it is at the higher speeds between 200 and about 350 R. P. M. At half speed, or 200 R. P. M., the induction motor transforms approximately one-half of its useful input into mechanical work in driving the fan and supplies the other half to the auxiliaries. At higher speeds the horsepower output of the induction motor increases rapidly and the energy supplied from its secondary starts to decrease until at 400 R. P. M., or synchronous speed when the secondary of the induction motor is short circuited, no power is transferred to the auxiliary speed control apparatus.

It is seen from these curves that the maximum amount of energy required to be taken care of by the auxiliary equipment occurs at about 250 R. P. M. and that it is slightly less than 15 per cent of the rated output of the induction motor. Hence in this case the capacity of the auxiliary machines need not be greater than 15 per cent of the full load rating of the induction motor. By providing speed control equipment having the desirable features previously explained and which can also take advantage of the relation pictured in Fig. 2 a very substantial saving in the auxiliary equipment is possible when a fan type of load is encountered. This may be illustrated by noting that if we had a load that varied at the first power of the speed, the horsepower output speed curve of the motor would be a straight line as the dash line C, and at half speed, where the induction motor horsepower output is of necessity approximately equal to the secondary output, it would be necessary to provide auxiliary equipment having a capacity of 50 per cent of the horsepower rating of the motor.

The equipment described may, of course, be used for controlling the speed of an induction motor which drives a load such as corresponds to curve C and certain of the desirable features of the equipment might lead to its selection for such purpose, but in such a case the auxiliary apparatus would need to be greatly increased in capacity in relation to the horsepower rating of the controlled motor. A fan load has been mentioned above, but there are other loads, such as the testing of aeroplane propellers, certain pump and ship propellers, where the economy explained could be realized to a greater or less extent by the use of this equipment. It may also be mentioned that the motor 10 can be reversed preferably by simply reversing the phase rotation of its primary and secondary circuits and that the motor 10 can be brought to a stop quickly from a high operating speed by causing it to operate as a generator by simple adjustment of the control apparatus described.

The apparatus described in Fig. 1 may, with the aid of additional auxiliary equipment, be extended for operation of the induction motor through synchronous speed, and such additional auxiliary equipment may then be disconnected and operation at various speeds above synchronism obtained with the apparatus already described. However, the equipment described is not recommended for operation greatly above synchronous speed, for example, not more than 10 per cent above synchronous speed where the motor drives a fan type of load, because, under such circumstances, the economy available with this apparatus for operation below synchronous speed rapidly diminishes if redesigned for operation materially above synchronous speed.

In Fig. 3 I have shown additional auxiliary equipment for use in getting the induction motor through synchronous speed and which may also be used for fine speed control at and close to synchronous speed. The two D.-C.-A.-C. motor generator sets which were explained in connection with Fig. 1 are used in Fig. 3. Except as hereinafter noted, their connections and manner of operation will be as previously described, and hence in Fig. 3 I have omitted some of these connections for the sake of clearness. It will further be assumed that the auxiliary A.-C.-D.-C. motor generator sets of Fig. 3 are designed for 15 percent of the capacity of the induction motor as was the case in Fig. 1, so that the economy features are similar for operation up to synchronous speed.

If in Fig. 1 it were possible to remove the load of the induction motor when approaching synchronous speed, it might be possible to get the apparatus to proceed through synchronism. However, at synchronous speed, machine 15 is theoretically at standstill and there is little, if any, power available from it to inject the necessary voltage into the secondary of induction motor 10 to pull it through synchronism even if unloaded. For the same reason, speed control at speeds very close to synchronism may not be as exacting as desired with the equipment of Fig. 1. In Fig. 3, therefore, I have provided additional apparatus for furnishing the necessary control voltage to the secondary of induction motor 10 when operating at and close to synchronous speed. For this purpose the stator winding of machine 15 is opened by means of a circuit breaker at 30 and the additional control voltage is introduced in series with this winding over wires 31. The additional control voltage is supplied by equipment substantially like that disclosed in U. S. Patent 1,449,784, March 27, 1923, consisting of an ohmic drop frequency changer 32 having the same number of poles and driven with the main induction motor and a commutator regulating machine 33 which is excited jointly from exciter 32 and from the secondary circuit of the main induction motor through an adjustable transformer 34. The exciter 32 is supplied through a step-down transformer 35 from the A.-C. source 13 and therefore produces excitation at the slip frequency of the main induction motor at all times. The excitation which it supplies to the commutator regulating machine 33 is adjustable by a rheostat 36. 37 is a switch for reversing the exciting field of machine 33. The commutator machine 33 is of a type that generates a frequency at its brushes the same as the frequency of the excitation supplied to the field windings. It is driven by a synchronous motor 39.

It is evident that with this added equipment, induction motor 10 may be operated through synchronous speed while fully loaded. In fact, continuous operation at and near synchronous speed might be accomplished with excitation furnished by machine 33 and with the machines 15 and 18 shut down. Likewise, below synchronous speed and above synchronous speed the set 33—39 preferably will be shut down and disconnected. The necessary circuit breakers will be provided for such purpose. When the induction motor operates above synchronous speed, energy is added instead of subtracted from its secondary. Hence, above synchronous speed machine 15 acts as a generator and machine 18 as a motor.

With the type of load described the load rises very fast above synchronous speed and hence we cannot go far above synchronous speed until we reach the load capacity of the sets 15—16—17 and 18—19—20, if, as assumed, they are designed for 15 per cent capacity of the full load rating of the induction motor. As shown on curve B, Fig. 2, above 400 R. P. M. the power through the auxiliary equipment reverses and increases rapidly and the full load capacity of the auxiliary equipment is reached at or just below 10 per cent supersynchronous speed. The power available from the auxiliary equipment may be augmented slightly by machine 33 if it is kept in operation and switch 30 remains open, but it is not intended that any appreciable amount of power will be supplied by machine 33.

It is thus seen that to retain the advantages of using auxiliary equipment of limited capacity when operating above synchronous speed with the type of load described, we cannot go above about 10 per cent in the supersynchronous speed range, and if much higher speeds than this are contemplated with a fan type of load, it will probably be more economical to use some other arrangement. However, if we have a different kind of load, for example a constant torque load above synchronous speed, this limitation would not apply and in such a case we could go to higher speeds without increasing the relative capacity of the auxiliary equipment. It is not intended to limit the scope of all of the appended claims to equipment for operating only fan type of loads, or to auxiliary equipment limited to 15 per cent of the capacity of the main induction motor.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In a control system, an induction motor of the wound secondary type, a source of alternating current supply for said motor, apparatus for controlling the speed of said motor below and above synchronous speed comprising a pair of synchronous-direct current motor generator sets, the direct current machines of the sets being connected together for Ward Leonard control and the synchronous machines of the sets being respectively connected to the secondary of said induction motor and to said source of supply, and additional auxiliary apparatus for enabling the operation of said motor through synchronous speed comprising a frequency changer exciter driven with said induction motor and supplied from said alternating current source, and an alternating current commutator-type generator excited jointly from said exciter and the secondary of said induction machine and producing a current of the same frequency as its excitation and means for connecting said commutator-type generator in series with the secondary of said induction motor comprising a series connection from the commutator type generator through the alternating current winding of that synchronous machine which is connected to the secondary of the induction machine and a circuit breaker for short-circuiting said connection between such synchronous machine and the commutator type generator.

2. In a control system, a main induction machine for driving a fan type of load having relatively rotatable, wound primary and secondary windings, a source of alternating current supply for the primary winding of said induction machine, a pair of motor generator sets each consisting of a synchronous machine and at least one direct current machine, one of said synchronous machines being directly connected in series with the secondary winding of said induction machine both during the starting and running operation of said induction machine and the other synchronous machine being connected to said source of alternating current supply, the direct current machines being connected in series, field windings for the direct current machines, a source of direct current excitation for said field windings, and means for independently varying the excitation of the direct current field windings of the direct current machines of the different motor generator sets both for the purpose of starting and controlling the running operation of said induction machine.

CHARLES C. CLYMER.